(12) United States Patent
Itakura et al.

(10) Patent No.: US 6,577,560 B2
(45) Date of Patent: Jun. 10, 2003

(54) MAGNETO-OPTIC RECORDING MEDIUM IN WHICH MAGNETIC PARTITION TRACKS ARE REMOVED FOR HIGH TRACK DENSITY

(75) Inventors: Akihiro Itakura, Kawasaki (JP); Masakazu Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/972,066

(22) Filed: Oct. 5, 2001

(65) Prior Publication Data

US 2002/0022155 A1 Feb. 21, 2002

Related U.S. Application Data

(63) Continuation of application No. PCT/JP99/03462, filed on Jun. 28, 1999.

(51) Int. Cl.[7] ................................................ G11B 11/00
(52) U.S. Cl. ............................... 369/13.08; 369/13.35; 369/275.4
(58) Field of Search ........................... 369/13.35, 275.1, 369/275.3, 275.4, 275.2, 44.26, 13.32, 13.33, 13.38, 13.09, 13.08, 13.06, 13.2, 13.02, 47.11, 13.07, 44.28, 13.47; 428/694 ML, 694 MM

(56) References Cited

U.S. PATENT DOCUMENTS 5,452,284 A  *  9/1995  Miyagawa et al. ......... 369/124
6,064,644 A  *  5/2000  Miyamoto et al. ......... 369/275.4

FOREIGN PATENT DOCUMENTS

| EP | 0 618 572 | 10/1994 |
|---|---|---|
| JP | 01-134728 | 5/1989 |
| JP | 02-201750 | 8/1990 |
| JP | 03-260914 | 11/1991 |
| JP | 04-216325 | 8/1992 |
| JP | 04-289539 | 10/1992 |
| JP | 06-076399 | 3/1994 |
| JP | 6-290496 | 10/1994 |
| JP | 08-007387 | 1/1996 |
| JP | 10-092038 | 4/1998 |
| JP | 10-269646 | 10/1998 |
| WO | WO 01/01409 | 1/2001 |

* cited by examiner

Primary Examiner—Ali Neyzari
(74) Attorney, Agent, or Firm—Greer, Burns & Crain, Ltd.

(57) ABSTRACT

A magneto-optic recording medium, which has a multilayered magnetic layer including a recording layer and a reproducing layer, is capable of reproducing a micro mark by utilizing a temperature distribution generated by laser beam irradiation for transferring a domain wall from the recording layer to the reproducing layer and by utilizing the movement of the domain wall. Each of the recording areas is arranged so that the recording area is adjacent to a magnetic partition area of a neighboring track. The recording areas and the magnetic partition areas are arranged alternately in one track, and an edge of a record mark is positioned in the recording area. Preferably, when reproducing information recorded on this magneto-optic recording medium, two neighboring tracks are irradiated with one laser beam for reproduction so that high speed transmission can be performed.

9 Claims, 10 Drawing Sheets

PRIOR ART

PRIOR ART

PRIOR ART

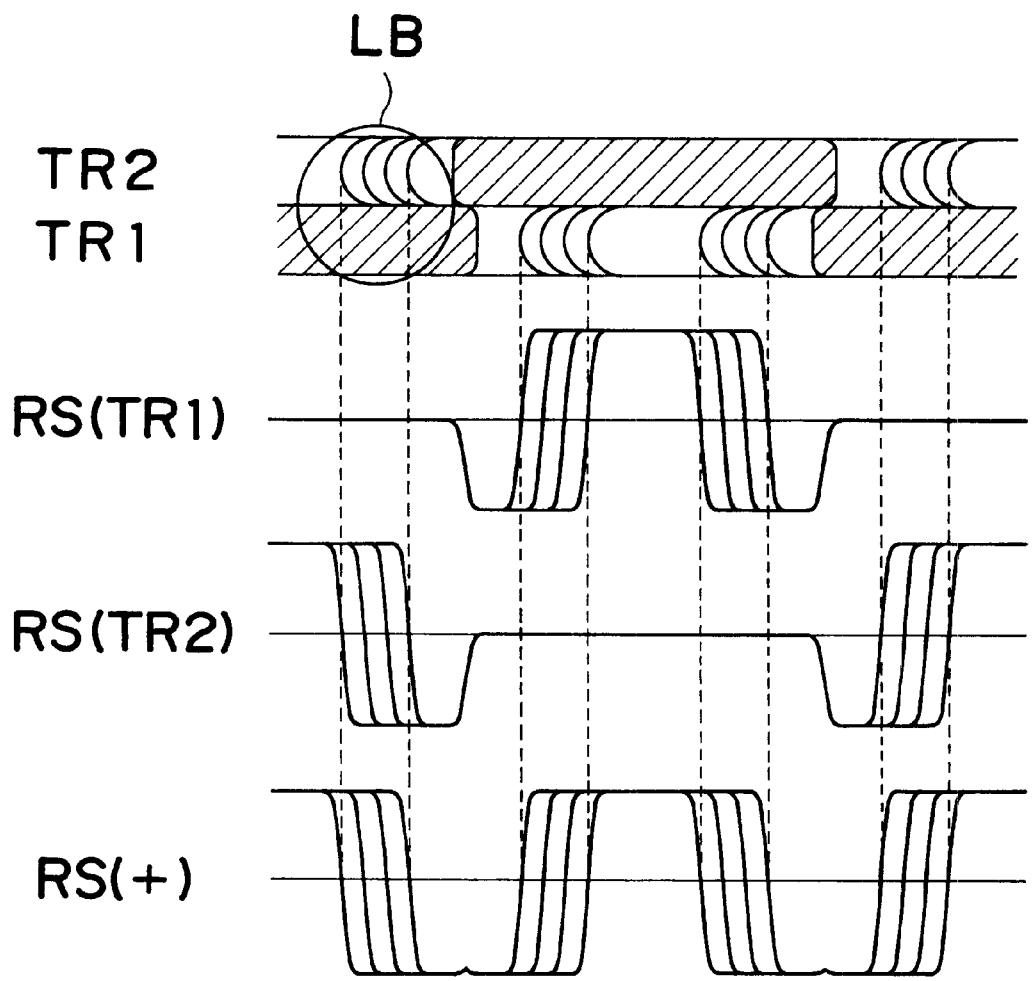

MAGNETO-OPTIC RECORDING MEDIUM IN WHICH MAGNETIC PARTITION TRACKS ARE REMOVED FOR HIGH TRACK DENSITY

This application is a continuation of International Application No. PCT/JP99/03462, filed Jun. 28, 1999.

FIELD OF THE INVENTION

The present invention relates to a magneto-optic recording medium as well as a high density magneto-optic recording and reproducing method and device, in which the recording medium has a multilayered magnetic layer including a recording layer and a reproducing layer. By utilizing temperature distribution generated by a laser beam irradiation, a magnetic domain is transferred from the recording layer to the reproducing layer. By detecting the magnetic domain that is enlarged after a domain wall moves, a micro mark can be reproduced beyond a resolution of an optical system.

DESCRIPTION OF THE PRIOR ART

A magneto-optic recording medium is a removable recording medium having advantages of large record capacity, high reliability and good portability. Such a magneto-optic recording medium is used widely in various applications such as a data recording medium of a computer or a recording medium of image data. Along with the various applications, the market demands for high density and large capacity has been increasing year after year.

There are two general methods for increasing record density (i.e., for increasing record capacity) in a disk-like recording medium on which data are recorded along tracks. In a first method, a record mark is downsized so that bit density in a track can be increased. In a second method, track density is increased.

In the case of a magneto-optic recording medium (usually called a magneto-optic disk), the first method is restricted by a spot diameter of a light beam that is irradiated to the recording medium. In order to reproduce a bit that was recorded in a period smaller than a beam spot diameter, a light beam having less beam spot should be used. However, the beam spot diameter cannot be smaller than a value determined by a wavelength $\lambda$ of a light source and a numerical aperture NA of an object lens. In other words, a micro mark cannot be reproduced beyond the resolution of the optical system.

However, as described in Japanese unexamined patent publication No. 6-290496 for example, a magneto-optic recording and reproducing method is proposed, which enables reproduction of a micro mark beyond the resolution of the optical system. This magneto-optic recording and reproducing method uses a recording medium having a multilayered magnetic layer including a recording layer and a reproducing layer. Temperature distribution due to a laser beam irradiation generates the expansion of a magnetic domain copied from the recording layer to the reproducing layer. The magnetic domain is detected after being enlarged by a movement of a domain wall, so that a micro mark can be reproduced. The principle of this magneto-optic recording and reproducing method will be explained below.

FIG. 1 shows a structure of the magnetic layer of the magneto-optic recording medium that is used for the magneto-optic recording and reproducing method and the principle of the signal reproduction. As shown in FIG. 1a, the magneto-optic recording medium 100 has a multilayered magnetic layer including a recording layer 101 having high coercivity of a domain wall, a switching layer 102 having a relatively low Curie temperature Ts and a reproducing layer 103 having low coercivity of a domain wall. When the magneto-optic recording medium 100 is irradiated with a laser beam LB, a temperature distribution TD is generated as shown by a graph in FIG. 1b. The temperature is the highest at the center of the beam spot and lower as departed from the center. However, the temperature distribution becomes asymmetric in accordance with a movement direction (a rotation direction) DD of the magneto-optic recording medium 100.

In the area where the temperature is lower than the Curie temperature Ts of the switching layer 102, the recording layer 101 and the reproducing layer 103 have exchange coupling with each other via the switching layer 102. Therefore, the domain wall movement is not generated in the reproducing layer 103 being hindered by the high domain wall coercivity of the recording layer 101. However, in the area RC including the beam spot center where the temperature is higher than the Curie temperature Ts of the switching layer 102, magnetization of the switching layer 102 is erased. As a result, the exchange coupling between the recording layer 101 and the reproducing layer 103 is cut off, and the movement DM of the domain wall to the high temperature side is generated in the reproducing layer 103 having low domain wall coercivity. Thus, the domain wall of the magnetic domain MS recorded on a track moves sequentially from the portion that reaches the Curie temperature Ts of the switching layer 102 to the center of the laser beam irradiation spot while the magneto-optic recording medium 100 rotates. This movement of the domain wall causes enlargement of the magnetic domain, which can be read by the laser beam LB.

As explained above, in the magneto-optic recording and reproducing method described in Japanese unexamined patent publication No. 6-290496, the recorded micro mark is reproduced not directly but indirectly. Namely, a magnetic domain, which was enlarged by the domain wall movement in the reproducing layer, is read. Thus, the micro mark can be reproduced beyond the resolution of the optical system.

However, the above-mentioned magneto-optic recording medium must have recording and reproducing tracks (also referred to simply as recording tracks) that are separated from neighboring tracks magnetically. For example, in one method, every other track of the recording tracks is irradiated with a high power laser beam to be heated, so that a magnetic partition area (a kind of track) having a different magnetic state is formed between the recording and reproducing tracks. In another method, a groove or a bank is formed between the recording and reproducing tracks so as to separate the tracks from each other spatially. In either method for making a magnetic partition area (a track), such a pseudotrack that does not contribute to information recording and reproducing directly may become an obstacle to the second method of realizing high density by shortening a track pitch.

There is another method for realizing high density of a magneto-optic recording medium as described in Japanese unexamined patent publication No. 6-76399, for example. In this multivalued recording method, an edge position of a record mark is shifted step by step from a predetermined reference position in accordance with record data.

FIG. 2 shows an example where an edge position of a record mark is shifted in four steps, so that four values (two bits) of information can be recorded in one record mark.

Prepits of a magneto-optic recording medium are reproduced by an optical head, so that a reference clock is produced from the reproduced signal. This reference clock is used as a modulation signal for recording magnetic field.

As shown in FIG. 2, external magnetic field EM having a polarity alternating at a predetermined frequency in accordance with a reference clock is applied to a magneto-optic recording medium by a magnetic head. On the other hand, a laser pulse LP is irradiated at a timing of t0, t1, t2 or t3 in accordance with record data. Thus, an edge of a record mark WM is shifted in four positions corresponding to the four timings t0–t3. In addition, after a half period (T/2), the external magnetic field EM having the opposite polarity is applied while the laser pulse LP is irradiated again at the timing of t0, t1, t2 or t3, so that a mark is recorded with an overlapping of the former mark.

By the above-mentioned multivalued recording method, bit density in a track is increased. However, if this recording method is combined with the above-mentioned domain wall movement type reproducing method, the recording tracks must be separated from each other magnetically as explained above. Namely, since the recording tracks RT and the magnetic partition areas (magnetic partition tracks) IT are arranged alternately as shown in FIG. 3, increase of the track density is still difficult.

SUMMARY OF THE INVENTION

The magneto-optic disk 21 is driven to rotate by a spindle motor (not shown). The optical head 22 irradiates the magneto-optic disk 21 with a laser beam and heats a predetermined spot so as to record data. In addition, for reproduction, the optical head 22 irradiates the magneto-optic disk 21 with a laser beam having less power than the recording laser beam and reproduce recorded data in accordance with reflected light from the magneto-optic disk 21. The magnetic head 23 is positioned so as to oppose the optical head 22 across the magneto-optic disk 21 and applies a magnetic field oriented in a vertical direction relative to a recording or reproducing spot of the magneto-optic disk 21. Furthermore, the optical head 22 and the magnetic head 23 are driven by a common seek mechanism in the radial direction of the magneto-optic disk 21.

The magneto-optic recording medium having such a structure according to the present invention does not need pseudotracks having only magnetic partition areas that do not contribute to recording and reproduction directly between the recording and reproducing tracks. Therefore, the track density can be increased. In a preferred embodiment, an edge of a record mark is positioned in the recording area. It is also preferable to position two consecutive edges of a record mark in the recording area. In addition, in order to produce a clock signal, prepits are formed at a predetermined pitch in a track, and the magnetic partition areas are preferably formed in synchronization with the prepits.

A magneto-optic recording method according to the present invention comprises the steps of arranging recording areas so that the recording area is adjacent to a magnetic partition area of a neighboring track, and recording information so that an edge of a record mark is positioned in the recording area. Preferably, two consecutive edges of the record mark are positioned in the recording area. It is also preferable to shift an edge position of the record mark step by step for realizing multivalued recording.

In addition, a magneto-optic recording and reproducing method according to the present invention comprises the steps of using the above-mentioned magneto-optic recording medium, and performing recording or reproduction by irradiating two neighboring tracks by one laser beam. In neighboring tracks, a recording area is always adjacent to a partition area. Therefore, two tracks can be reproduced by one laser beam at the same time. Thus, information content per time increases so that a high speed transmission can be realized.

A magneto-optic recording and reproducing device according to the present invention comprises an optical head for irradiating a magneto-optic recording medium with a laser beam so as to record data and for irradiating the magneto-optic recording medium with a laser beam having less power than the recording laser beam so as to read record data from the reflected light, a clock generating circuit for producing a reference clock from a signal obtained by the optical head reading prepits recorded previously on the magneto-optic recording medium, a magnetic head and its driving circuit for applying alternating magnetic field to the magneto-optic recording medium in accordance with the reference clock, a pulse phase modulation circuit for generating a recording signal in accordance with the reference clock so as to arrange recording areas and magnetic partition areas being adjacent to each other between the neighboring tracks and to arrange the recording areas and the magnetic partition areas alternately in one track and to position an edge of a record mark shifted step by step for multivalued recording in the recording area in accordance with record data, a laser driving circuit for irradiating a laser beam from the optical head in accordance with the recording signal, and a signal processing circuit and a demodulation circuit for processing and demodulating the reproduced signal obtained by the optical head.

BRIEF DESCRIPTION OF THE DRAWINGS

FIG. 10 is a diagram showing another example of the magneto-optic recording and reproducing method according to another embodiment of the present invention.

DESCRIPTION OF THE PREFERRED EMBODIMENTS

Figure 4:
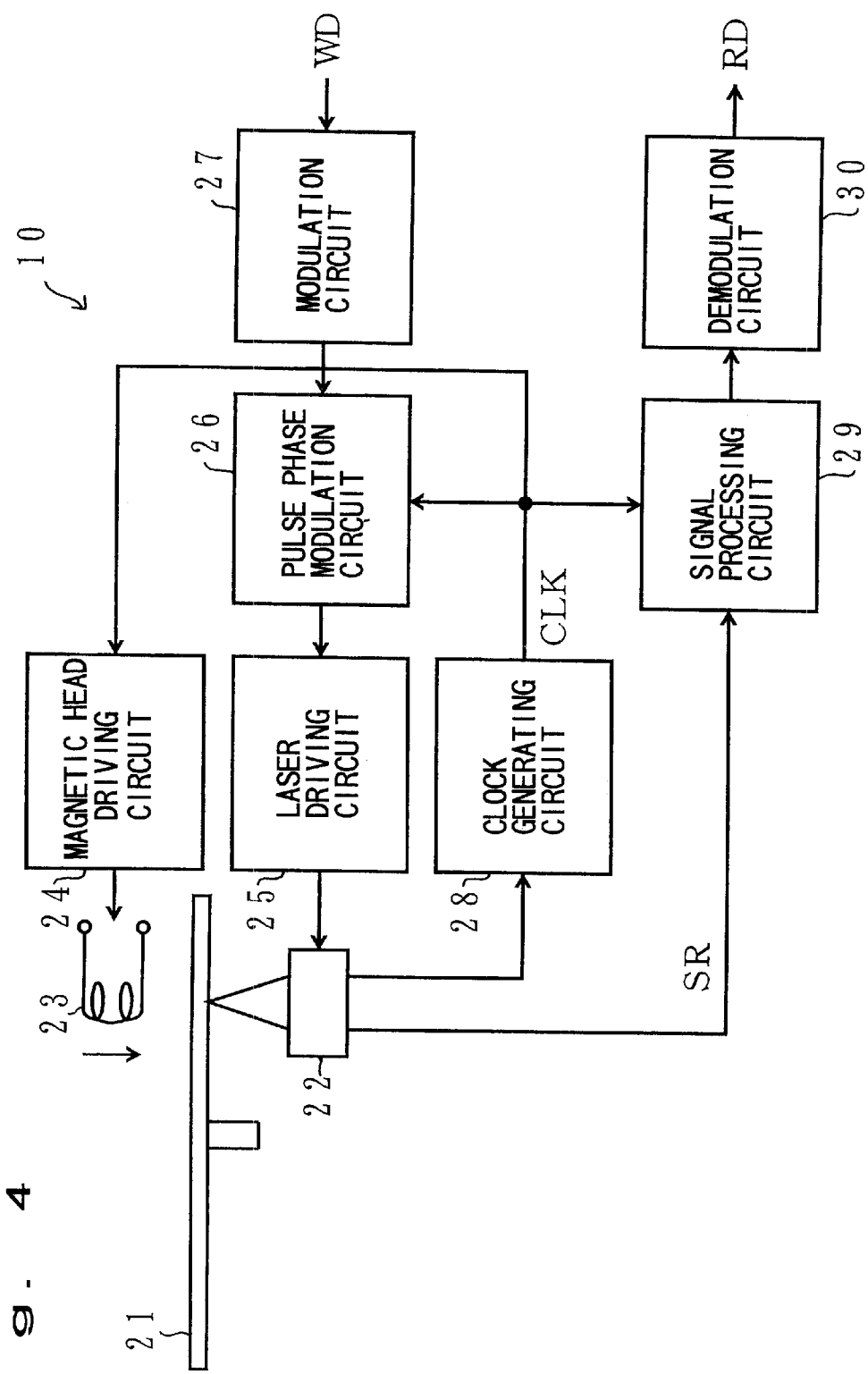
FIG. 4 is a block diagram showing a schematic structure of a magneto-optic recording and reproducing device according to an embodiment of the present invention.

FIG. 4 is a block diagram showing a schematic structure of a magneto-optic recording and reproducing device according to an embodiment of the present invention. This magneto-optic recording and reproducing device 10 comprises a magneto-optic disk (a magneto-optic recording medium) 21, an optical head 22, a magnetic head 23, a magnetic head driving circuit 24, a laser driving circuit 25, a pulse phase modulation circuit 26, a modulation circuit 27, a clock generating circuit 28, a signal processing circuit 29 and a demodulation circuit 30.

The magneto-optic disk 21 is driven to rotate by a spindle motor (not shown). The optical head 22 irradiates the magneto-optic disk 21 with a laser beam and heats a predetermined spot so as to record data. In addition, for reproduction, the optical head 22 irradiates the magneto-optic disk 21 with a laser beam having less power than the recording laser beam and reproduce recorded data in accordance with reflected light from the magneto-optic disk 21. The magnetic head 23 is positioned so as to oppose the optical head 22 across the magneto-optic disk 21 and applies magnetic field having the vertical direction to a recording or reproducing spot of the magneto-optic disk 21. Furthermore, the optical head 22 and the magnetic head 23 are driven by a common seek mechanism in the radial direction of the magneto-optic disk 21.

First, an operation of the magneto-optic recording and reproducing device 10 having the above-mentioned structure in data recording will be explained. Record data WD are modulated by the modulation circuit 27 into a recording signal, which is given to the pulse phase modulation circuit 26. The pulse phase modulation circuit 26 is also supplied with a reference clock signal CLK from the clock generating circuit 28. The clock generating circuit 28 generates the reference clock signal CLK from a signal obtained when the optical head 22 reads prepits formed previously on the magneto-optic disk 21. The pulse phase modulation circuit 26 generates a recording signal having a shifted phase of leading or trailing edge in accordance with the reference clock signal CLK from the clock generating circuit 28 and the recording signal from the modulation circuit 27. The generated recording signal is supplied to the laser driving circuit 25.

Figure 1:
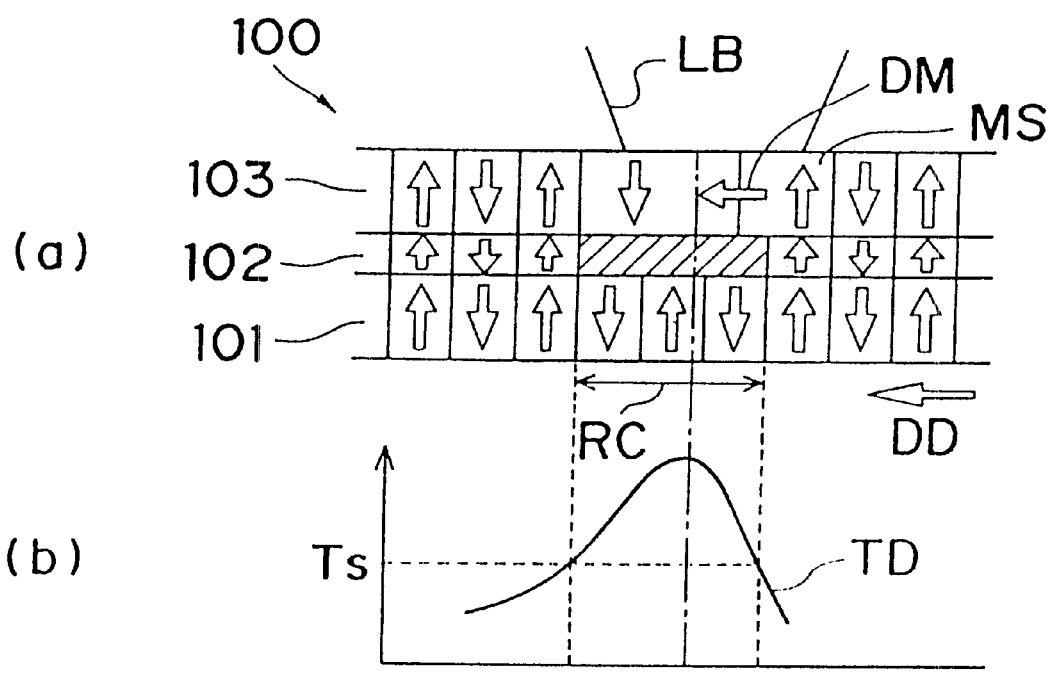
FIG. 1 is a diagram showing a magnetic layer structure of a magneto-optic recording medium and a principle of signal reproduction in the conventional magneto-optic recording and reproducing method.
Figure 2:
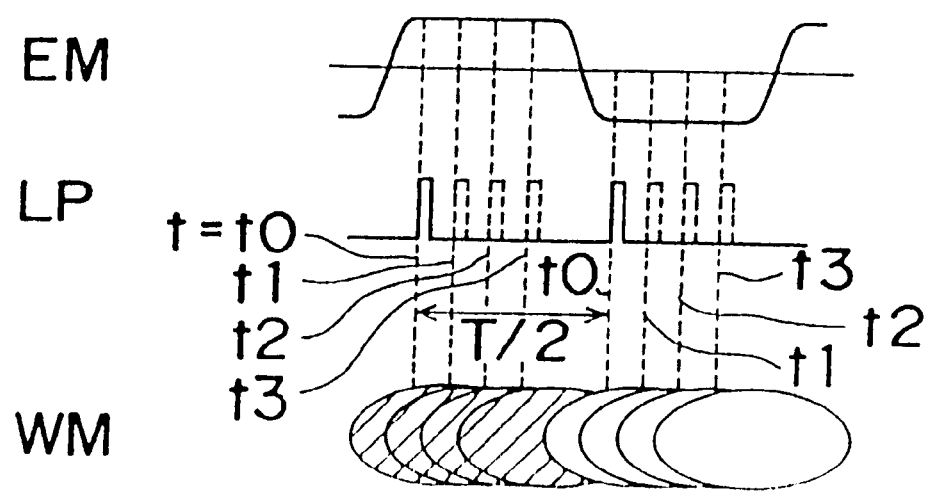
FIG. 2 is a diagram showing a recording method in which an edge position of a record mark is shifted in four steps in the conventional magneto-optic recording and reproducing method.
Figure 3:
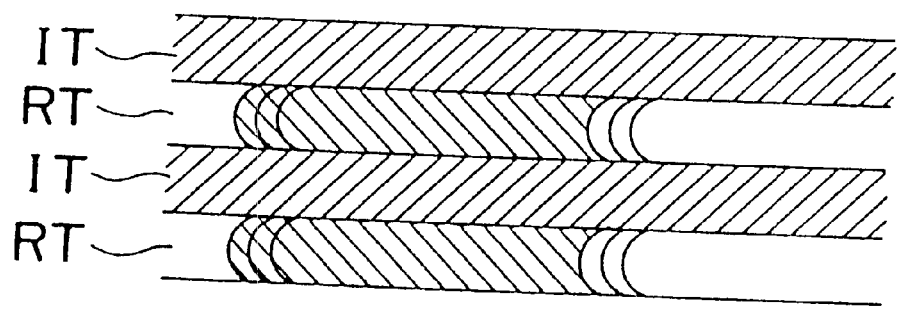
FIG. 3 is a diagram showing the conventional structure of a magneto-optic recording medium in which recording and reproducing tracks and magnetic partition areas (tracks) are arranged alternately.

The laser driving circuit 25 generates a laser pulse LP in synchronization with the leading or trailing edge of the multivalued recording signal as shown in FIG. 2, so as to drive a laser beam source (a semiconductor laser) of the optical head 22. In addition, the reference clock signal CLK is imparted to the magnetic head driving circuit 24, which reverses a polarity of the magnetic field generated by the magnetic head 23 in synchronization with the reference clock signal CLK.

As explained above, when writing a record mark on the magneto-optic disk 21, the pulse phase modulation circuit 26 controls a pulse position so that a recording area is adjacent to a magnetic partition area of a neighboring track. Schematic diagrams of tracks that are recorded in this way are shown in FIGS. 5 and 6.

Figure 5:
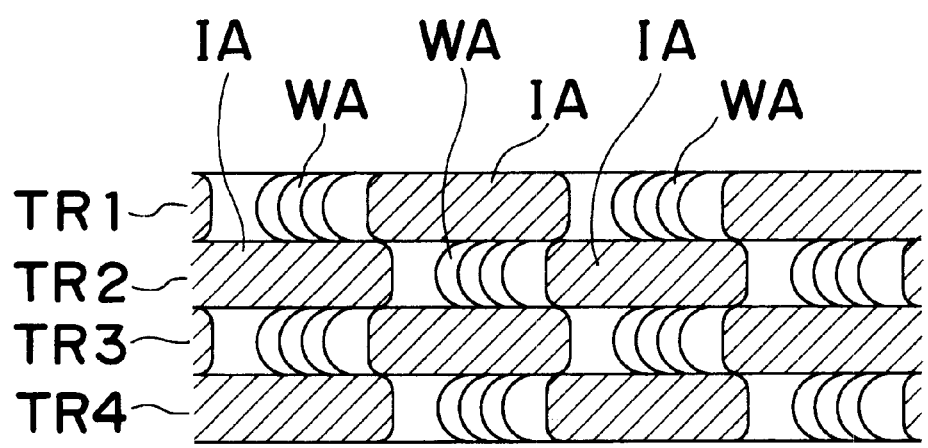
FIG. 5 is a diagram showing a structure of a magneto-optic recording medium according to the present invention, in which recording areas and magnetic partition areas are arranged so as to be adjacent to each other.

In the example shown in FIG. 5, noting four tracks TR1–TR4, a recording area WA and a magnetic partition area IA are arranged alternately in each of the tracks. The recording area WA is always adjacent to a magnetic partition area IA of a neighboring track. In other words, the length of the recording area WA is substantially the same as that of the magnetic partition area IA, and the recording areas WA and the magnetic partition areas IA are arranged in a grid pattern on the surface of the magneto-optic disk 21.

Figure 6:
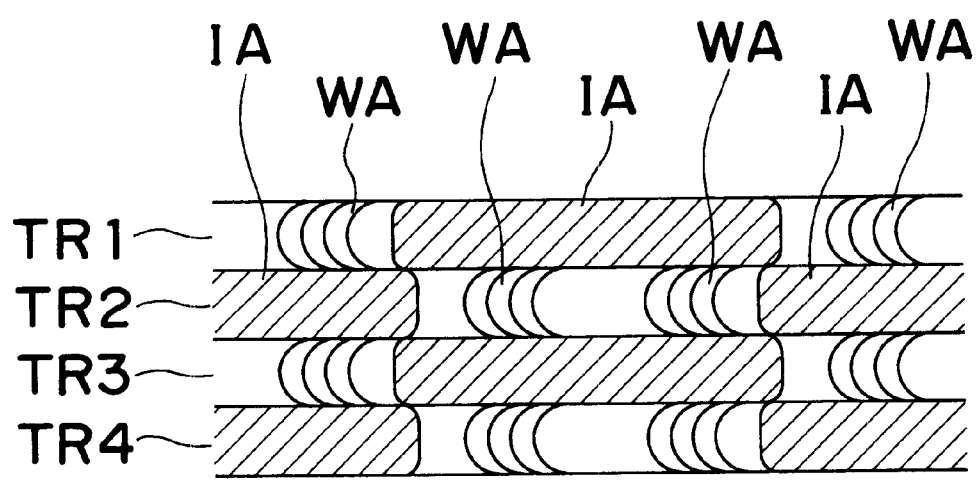
FIG. 6 is a diagram showing another example of a magneto-optic recording medium according to the present invention, in which recording areas and magnetic partition areas are arranged so as to be adjacent to each other.

In the example shown in FIG. 6, two consecutive recording areas WA and a magnetic partition area IA are arranged alternately in each of the tracks, and also the recording area WA is always adjacent to a magnetic partition area IA of a neighboring track. In other words, the length of the magnetic partition area IA is substantially the same as that of two recording areas WA. In this case, two consecutive recording areas WA are written by the leading edge and the trailing edge of the recording signal. The number of edges formed in one recording area is not limited to two but can be three or more.

Figure 7:
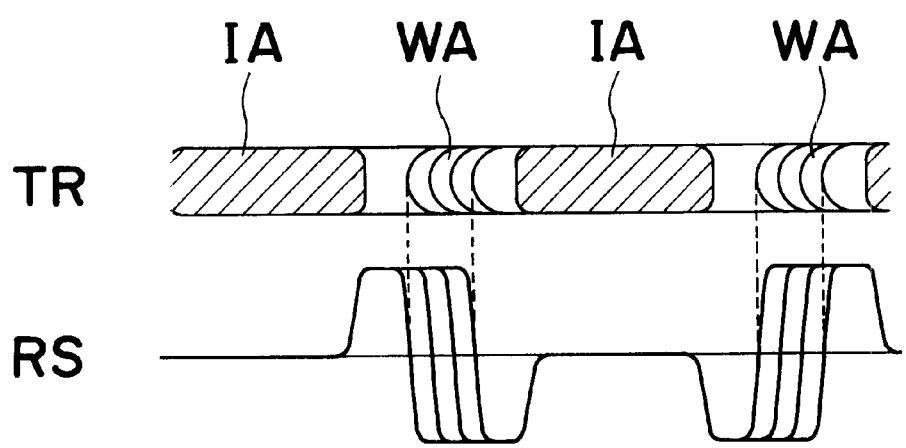
FIG. 7 is a diagram showing an example of a reproduced signal that is obtained from the magneto-optic recording medium shown in FIG. 5.
Figure 8:
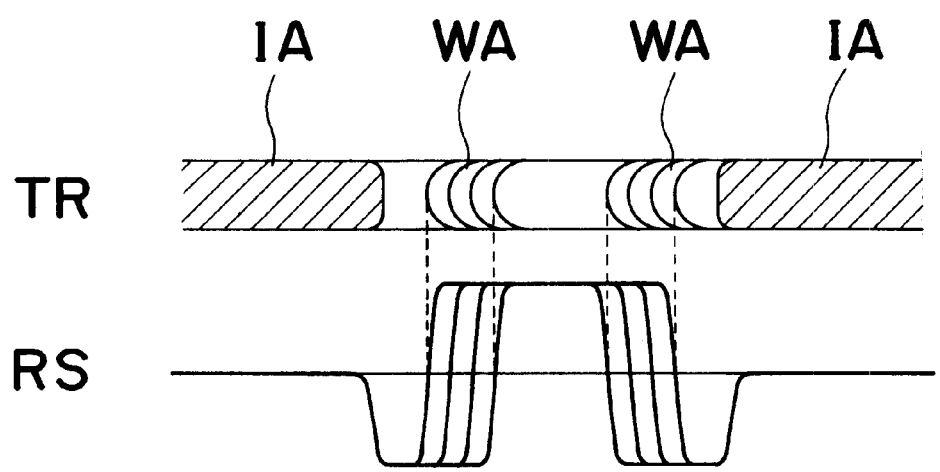
FIG. 8 is a diagram showing an example of a reproduced signal that is obtained from the magneto-optic recording medium shown in FIG. 6.

Next, an operation of the magneto-optic recording and reproducing device 10 in data reproduction will be explained. Also in this embodiment, in the same way as explained in the conventional method, the temperature distribution generated by the laser beam irradiation is utilized for transferring a domain wall from the recording layer to the reproducing layer, so that a record mark smaller than the beam spot can be reproduced by detecting the movement of the domain wall. The explanation of the reproduction mechanism is omitted here since it is already explained above. The optical head 22 outputs a reproduced signal RS as shown in FIGS. 7 and 8. FIG. 7 shows the reproduced signal RS of a certain track TR in the data recording example shown in FIG. 5. In the same way, FIG. 8 shows the reproduced signal RS in the data recording example shown in FIG. 6.

Each of these reproduced signals RS includes information of Kerr rotation angle when a laser beam enters a light receiving element of the optical head 22 after emitted by the laser beam source of the optical head 22 and reflected by the magneto-optic disk 21. The reproduced signal RS is given to the signal processing circuit 29 from the optical head 22 and is demodulated by the demodulation circuit 30 to be reproduced data RD.

Figure 9:
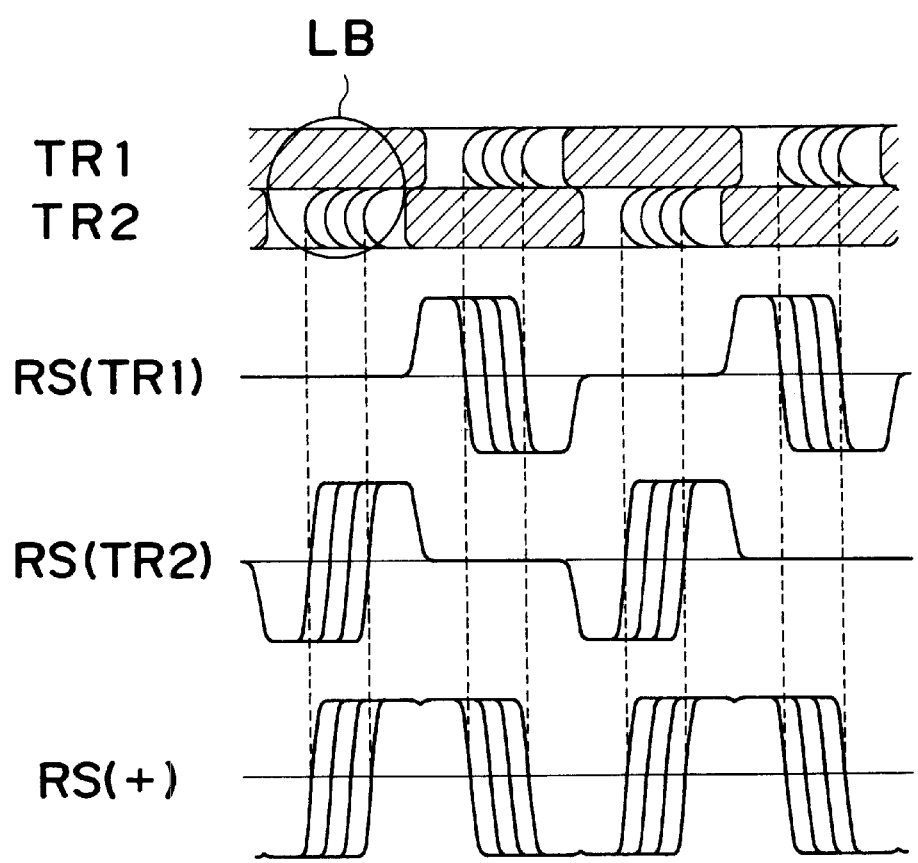
FIG. 9 is a diagram showing a magneto-optic recording and reproducing method according to another embodiment of the present invention.

FIGS. 9 and 10 show magneto-optic recording and reproducing methods according to another embodiment of the present invention. In this embodiment, two tracks are reproduced simultaneously by one laser beam. Since the recording area is always adjacent to the magnetic partition area of the neighboring track in the magneto-optic disk according to the present invention, two tracks can be reproduced simultaneously by one laser beam. Thus, the track density can be further increased.

FIG. 9 shows signals when two tracks are reproduced simultaneously using the magneto-optic disk on which data are recorded in the pattern as shown in FIG. 5. The reproduced signal of the track TR1 is like RS(TR1), while the reproduced signal of the track TR2 is like RS(TR2). Therefore, the reproduced signal RS(+) when two tracks are reproduced simultaneously is like a superposed waveform of the reproduced signal RS(TR1) and the reproduced signal RS(TR2).

FIG. 10 shows signals when two tracks are reproduced simultaneously using the magneto-optic disk on which data are recorded in the pattern as shown in FIG. 6. In this case too, the reproduced signal RS(+) when two tracks are reproduced simultaneously is like a superposed waveform of the reproduced signal RS(TR1) and the reproduced signal RS(TR2).

Thus, by reproducing two tracks simultaneously, information per time increases, so that high speed transmission can be performed.

INDUSTRIAL AVAILABILITY

According to the present invention, a magnetic partition tracks between recording tracks are not required in a magneto-optic recording medium having a multilayered magnetic layer including a recording layer and a reproducing layer, in which temperature distribution generated by laser beam irradiation generates the expansion of a domain wall copied from the recording layer to the reproducing layer and a micro mark can be reproduced by detecting the movement of the domain wall and in a high density magneto-optic recording and reproducing device using the magneto-optic recording medium. Therefore, the track density can be increased.

What is claimed is:

1. A magneto-optic recording medium having a plurality of coaxial tracks for recording information, each of the tracks including recording areas and magnetic partition areas that are arranged so that a recording area is adjacent to a magnetic partition area of a neighboring track, and that one or more recording areas and one magnetic partition area are arranged alternately in a track.

2. The magneto-optic recording medium according to claim 1, wherein an edge of a record mark is positioned in the recording area.

3. The magneto-optic recording medium according to claim 1, wherein two or more consecutive edges of a record mark are positioned in the recording area.

4. The magneto-optic recording medium according to claim 1, wherein prepits are formed for generating a clock signal, and the magnetic partition areas are formed in synchronization with the prepits.

5. A method for recording information using a magneto-optic recording medium, the method comprising the steps of:

arranging each of recording areas so that a recording area is adjacent to a magnetic partition area of a neighboring track; and recording information so that one or more recording areas and one magnetic partition area are arranged alternately in a track and that an edge of a record mark is positioned in the recording area.

6. The method according to claim 5, wherein the recording step includes positioning two consecutive edges of the record mark in the recording area.

7. The method according to claim 5, further comprising the step of shifting an edge position of the record mark step by step for realizing multivalued recording.

8. A method for recording and reproducing information using a magneto-optic recording medium, the method comprising the steps of:

arranging recording areas and magnetic partition areas so that a recording area is adjacent to a magnetic partition area of a neighboring track;

recording information so that one or more recording areas and one magnetic partition area are arranged alternately in a track; and irradiating two neighboring tracks by one laser beam when reproducing information.

9. A magneto-optic recording and reproducing device, comprising:

an optical head for irradiating a magneto-optic recording medium with a laser beam so as to record data and for irradiating the magneto-optic recording medium with a laser beam having less power than the recording laser beam so as to read record data from the reflected light;

a clock generating circuit for producing a reference clock from a signal obtained by the optical head reading prepits recorded previously on the magneto-optic recording medium;

a magnetic head and a driving circuit for applying alternating magnetic field to the magneto-optic recording medium in accordance with the reference clock;

a pulse phase modulation circuit for generating a recording signal in accordance with the reference clock so as to arrange recording areas and magnetic partition areas being adjacent to each other between neighboring tracks and to arrange the recording areas and the magnetic partition areas alternately in one track and to position an edge of a record mark shifted step by step for multivalued recording in the recording area in accordance with record data;

a laser driving circuit for irradiating a laser beam from the optical head in accordance with the recording signal; and a signal processing circuit and a demodulation circuit for processing and demodulating a reproduced signal obtained by the optical head.

* * * * *